United States Patent
Greene et al.

(10) Patent No.: US 7,268,504 B2
(45) Date of Patent: Sep. 11, 2007

(54) STATOR POSITION FEEDBACK CONTROLLER

(75) Inventors: Philip M. Greene, Hingham, MA (US); Alon Harpaz, Ashland, MA (US)

(73) Assignee: Kollomorgen Corporation, Westborough, MA (US)

( * ) Notice: Subject to any disclaimer, the term of this patent is extended or adjusted under 35 U.S.C. 154(b) by 256 days.

(21) Appl. No.: 10/900,228

(22) Filed: Jul. 27, 2004

(65) Prior Publication Data

US 2005/0067985 A1    Mar. 31, 2005

Related U.S. Application Data

(63) Continuation-in-part of application No. 10/155,058, filed on May 24, 2002, now Pat. No. 6,844,635.

(51) Int. Cl.
*G05B 11/00* (2006.01)
*G03B 27/58* (2006.01)
*H01L 21/00* (2006.01)

(52) U.S. Cl. ............... 318/115; 318/560; 318/114; 318/686; 318/687; 310/12; 355/74

(58) Field of Classification Search ............... None
See application file for complete search history.

(56) References Cited

U.S. PATENT DOCUMENTS

| | | | |
|---|---|---|---|
| 6,449,030 B1 * | 9/2002 | Kwan | 355/72 |
| 6,472,840 B1 * | 10/2002 | Takahashi | 318/649 |
| 6,525,803 B2 * | 2/2003 | Kwan et al. | 318/649 |
| 6,717,653 B2 * | 4/2004 | Iwamoto et al. | 355/72 |
| 2002/0018195 A1 * | 2/2002 | Iwamoto et al. | 355/72 |

* cited by examiner

*Primary Examiner*—Lincoln Donovan
*Assistant Examiner*—Eduardo Colon Santana
(74) *Attorney, Agent, or Firm*—Sam Pasternack; Choate Hall & Stewart LLP

(57) ABSTRACT

Stator position feedback controller. A first position monitoring device responds to the position of a stator supported for relative motion by a machine base. A second position monitoring device responds to the position of a carriage with respect to the machine base. An actuator is provided to move the carriage through interaction with the stator. A servo controller responds to the difference in the output of the first and second position monitoring devices to control the position of the carriage with respect to the machine base.

4 Claims, 1 Drawing Sheet

STATOR POSITION FEEDBACK CONTROLLER

This application is a continuation-in-part of U.S. patent application Ser. No. 10/155,058 filed May 24, 2002 now U.S. Pat. No. 6,844,635 entitled "Reaction Force Transfer System," the content of which is incorporated herein by reference in its entirety.

BACKGROUND OF THE INVENTION

This invention relates to a stator position feedback controller in a system in which a stator is supported for motion with respect to a machine base.

Co-pending U.S. patent application Ser. No. 10/155,058 filed May 24, 2002 entitled "Reaction Force Transfer System" is directed to a precision machine for controlling the position of a work piece relative to a tool. As taught in that patent application, the stator of a linear motor, rather than being rigidly affixed to a machine base, is allowed to move with respect to the machine base. The stator itself is connected to an external frame in a manner to constrain the stator to a single degree of freedom of motion. The decoupling of the stator from being rigidly affixed to the machine base eliminates excessive motion of the machine base that would otherwise be generated by the reaction force as the carriage is accelerated thereby minimizing detrimental side effects of such motion.

In some prior art actuators the electrical control of the actuator requires accurate feedback of the position of the actuator's moving element with respect to the actuator's stator. When, as in the case of an actuator's stator being rigidly connected to a machine base, the feedback source of the moving carriage used for position control can also be used to develop the electrical signal to the actuator. This signal is commonly known as "commutation" based on the manipulation of current through motor phases. The position of the actuator's moving element relative to the actuator's stator is correlated to the electrical controls through some initialization process and from that point on the relative position is continuously updated according to the moving carriage's position feedback source information.

Because the stator in the patent application noted above is not rigidly connected to the machine base it is free to move relative to the machine base in a direction of thrust. Thus, the relative position between the actuator's moving element and the actuator's stator is not accurately represented by the moving carriage's position feedback source. In some actuators such as linear motors, performance may be degraded because at any given motor current the developed thrust is reduced according to the deviation from exact "commutation" position. This potential problem was discussed in the above noted patent application.

One possible solution to this problem is to install an additional position feedback device such as an encoder with the encoder readhead attached to the actuator's moving element (or to the moving carriage) and its scale affixed to the actuator's stator. This feedback device would then be used for the purpose of "commutation" alone. Because the encoder scale is rigidly coupled to the actuator's stator, the signal from this feedback device always represents the true relative position between the actuator's moving element (carriage) and the actuator's stator. This solution, however, is expensive because the axis travel may be long requiring a long encoder scale; in addition, another encoder readhead will have to be mounted to the moving carriage requiring another signal cable and increasing cable management complexity.

SUMMARY OF THE INVENTION

The stator position feedback controller of the invention includes a stator supported for relative motion with respect to a machine base. A first position monitoring device is responsive to position of the stator with respect to the machine base. Suitable position monitoring devices include, for example, encoders and LVDTs. An actuator is provided for moving a carriage through interaction with the stator and a second position monitoring device is responsive to position of the carriage with respect to the machine base. A servo controller responds to an output of the second position monitoring device minus an output of the first position monitoring device to control the position of the carriage with respect to the machine base. In a preferred embodiment, the first position monitoring device has an encoder scale affixed to the stator and a readhead affixed to the machine base. Similarly, in this embodiment the second encoder has an encoder scale affixed to the machine base and a readhead affixed to the actuator. The servo controller comprises a commutation algorithm to control the position of the moving carriage.

BRIEF DESCRIPTION OF THE DRAWINGS

The single FIGURE of the drawing is a block diagram of an embodiment of the control system of the invention.

DESCRIPTION OF THE PREFERRED EMBODIMENTS

Figure 1:
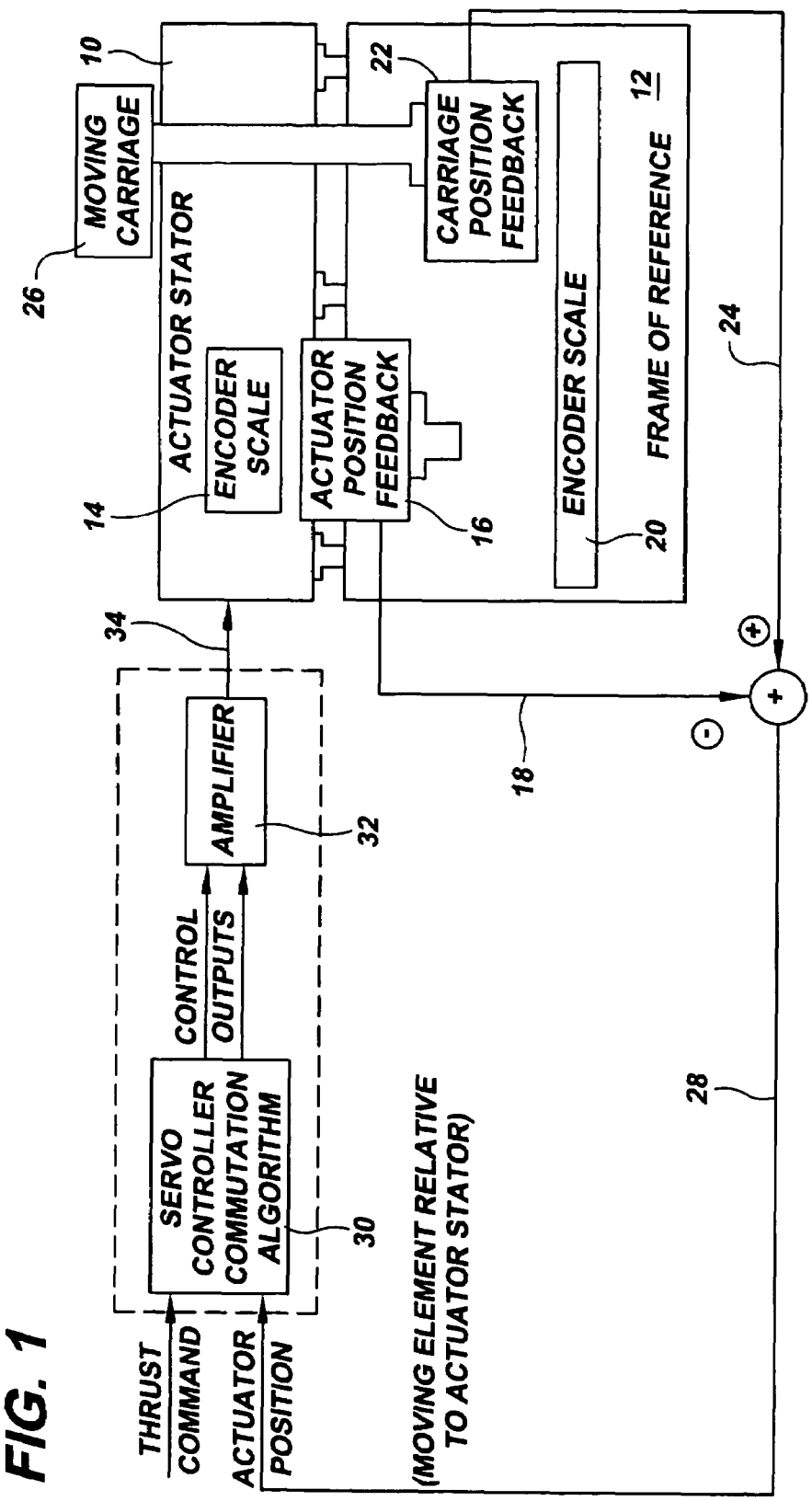

As discussed above, degradation in actuator performance can result from an unmeasured motion of the stator relative to the machine base. The present invention is based on the fact that it is possible to measure accurately this relative motion and modify a commutation algorithm within a servo controller such that the relative motion between machine base and stator is taken into consideration. A resulting modified commutation algorithm will therefore have exact knowledge of the relative position between the actuator's moving element and the actuator's stator and thus be capable of developing optimal commutation so as to achieve maximum trust per given current level.

With reference now to the single figure of the drawing, an actuator stator 10 is supported on a machine base 12 as described in the above-mentioned co-pending U.S. patent application. Thus, there can be relative motion between the stator 10 and machine base or frame of reference 12. An encoder scale 14 is affixed to the stator 10 and an encoder readhead 16 is affixed to the machine base 12. The encoder scale 14 and the encoder readhead 16 cooperate to generate a signal 18 proportional to the position of the stator 10 with respect to the machine base 12. Similarly, an encoder scale 20 on machine base 12 cooperates with a carriage position feedback readhead 22 to generate a signal 24 proportional to the location of a moving carriage 26 with respect to the machine base 12. It is noted that any other position monitoring devices can be used instead of encoders.

As those skilled in the art will appreciate the signal 18 is subtracted from the signal 24 to generate a signal 28 that becomes an error signal input to a servo controlled commutation algorithm 30. Outputs from the servo controller commutation algorithm 30 is amplified by an amplifier 32 to generate a signal 34 to drive the carriage 26 to position accurately the carriage 26 with respect to the machine base 12. Initialization of commutation is conducted by standard techniques known to those of ordinary skill in the art. Thereafter, the relative position between the actuator's moving element and the actuator's stator is updated according to feedback from the position feedback devices 16 and 22. The present control system allows a carriage to be positioned with respect to a machine base as accurately as it could have been in prior art apparatus in which the stator was rigidly attached to the machine base.

It is recognized that modifications and variations of the present invention will occur to those of ordinary skill in the art and it is intended that all such modifications and variations be included within the scope of the appended claims.

What is claimed is:

1. Stator position feedback controller comprising:
    a stator supported for relative motion with respect to a machine base;
    a first position monitoring device responsive to position of the stator with respect to the machine base;
    an actuator for moving a carriage through interaction with the stator;
    a second position monitoring device responsive to position of the carriage with respect to the machine base; and
    a servo controller responsive to an output of the second position monitoring device minus an output of the first position monitoring device to control the position of the carriage with respect to the machine base.

2. The feedback controller of claim 1 wherein the first position monitoring device is an encoder and has an encoder scale affixed to the stator and a readhead affixed to the machine base.

3. The feedback controller of claim 1 wherein the second position monitoring device is an encoder and has an encoder scale affixed to the machine base and a readhead affixed to the actuator.

4. The feedback controller of claim 1 wherein the servo controller comprises a commutation algorithm.

* * * * *